(No Model.) 6 Sheets—Sheet 1.

S. A. WOODS & J. R. THOMAS.
PLANING MACHINE.

No. 374,283. Patented Dec. 6, 1887.

WITNESSES:

INVENTOR

ATTORNEY (No Model.) 6 Sheets—Sheet 4.

S. A. WOODS & J. R. THOMAS.
PLANING MACHINE.

No. 374,283. Patented Dec. 6, 1887.

WITNESSES:
Chas L Fitch
N. P. Ockington

INVENTOR
Solomon A. Woods
John R. Thomas
BY David Heeter
ATTORNEY

UNITED STATES PATENT OFFICE.

SOLOMON A. WOODS AND JOHN R. THOMAS, OF BOSTON, MASSACHUSETTS, ASSIGNORS TO THE S. A. WOODS MACHINE COMPANY.

PLANING-MACHINE.

SPECIFICATION forming part of Letters Patent No. 374,233, dated December 6, 1887.

Application filed September 18, 1886. Serial No. 213,857. (No model.)

*To all whom it may concern:*

Be it known that we, SOLOMON A. WOODS and JOHN R. THOMAS, of Boston, in the county of Suffolk and Commonwealth of Massachusetts, have made a new and useful invention relating to Planing-Machines, of which the following is a specification.

Our invention relates to machines for planing and dressing wood and lumber; and it consists in certain new and useful constructions and combinations of the several parts of the same, substantially as hereinafter described and claimed.

A is the main frame-work of the machine.

B is the lower planing-cylinder.

B' is the upper planing-cylinder provided with the ordinary pressure-bar on its feed-out side, which is mounted in the well-known way.

C C are the feed-rolls on the feeding-out side of the upper planing-cylinder.

C' C' are the feed-rolls on the feeding-in side of the upper planing-cylinder.

D is the bed of the machine, over which the lumber is fed, which, in this instance, is shown as slotted, although it may be made solid, if preferred. This bed is shown with transverse slots, in which a longitudinal guide may be mounted, and with a shaft and crank with scale and pointers for adjusting the same when applied; but for the sake of clearness the guide and its connections to these parts are omitted.

D' is the main driving-shaft carrying the pulleys to which the operative parts of the machine are belted. The pulley $d$ upon it is belted to the pulley $b$. The pulley $d'$ is belted to the pulley $b'$, the pulleys $b$ and $b'$ being respectively attached to the lower and upper planing-cylinders. The pulley $d^2$ is belted to the pulley $b^2$ on the opposite end of the shaft of the upper planing-cylinder. The long pulley $d^3$ is belted onto the tight and loose pulleys $b^3$ $b^4$, mounted on the counter-shaft, which drives the feed-rolls C C'. The belt-shipper $b^5$ is used to shift the belt driving the feed-rolls from the tight pulley $b^3$ to the loose pulley $b^4$, and consists of a strap surrounding the belt and made to move it in the usual manner.

E E are the vertical shafts carrying the matcher-heads on each side of the path of the board through the machine.

A' is the supplemental table on the feed-out side of the machine, (which is hung on the pivots $a$ $a$ in line horizontally across the machine, and having their ends fixed in the frame A.) It is provided with undercut transverse grooves for attaching a guide thereto in the usual manner. This supplemental table is sustained in a horizontal position by swinging bolts $a'$, provided with nuts and working in slotted ears $z^2$, substantially as shown and described in the application of S. A. Woods for improvement in planing-machines, filed December 3, 1885, Serial No. 184,608, which construction is well known and in public use.

Figure 4:
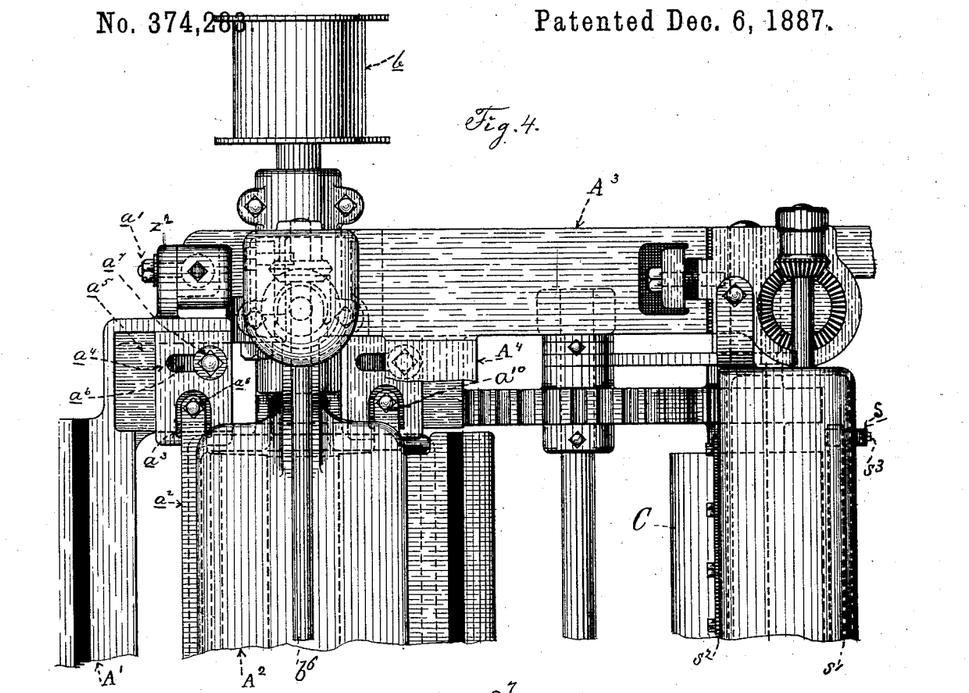
Fig. 4 is a top plan view of Fig. 3.

Attached to the supplemental table A' is the pressure-bar $a^2$, having its ends sliding up and down in grooves $a^3$, Fig. 4, in metal blocks $a^4$. These metal blocks fit into recesses $a^5$ at each end of the supplemental table, which recesses are large enough longitudinally of the machine to allow the blocks $a^4$ to slide horizontally in them toward and away from the lower planing cylinder, the bottoms of these recesses being formed of strips bolted to the frame. Each of these sliding blocks is provided with a slot, $a^6$, extending vertically through it, and a screw-bolt, $a^7$, passes downward through this slot and is tapped into the table A' in the bottom of the recess $a^5$. By tightening up the bolt $a^7$ the sliding block $a^4$ may be secured at any desired place within the scope of its horizontal movement in the recess $a^5$, and the bar $a^2$ may thus be set nearer to or farther away from the path of the knives of the lower planing-cylinder, as desired. A washer is shown beneath the head of screw-bolt $a^7$ and resting on top of the sliding block $a^4$.

In order to provide for the vertical adjustment of the bar $a^2$ in the slots $a^3$, in which its ends move up and down, a screw-bolt, $a^8$, is passed through each end of the bar which lies in the slot, this screw-bolt being tapped into the hole through which it passes in the end of the bar, and being journaled at its lower end in the sliding block $a^4$, so as to revolve freely therein. A check-nut, $a^9$, engages with the bolt $a^8$ above the bar $a^2$, and, being set up against the bar after it has been adjusted to the proper position by the screw-bolts $a^8$ at each end, secures it in such position.

It will be observed that the parts of the bar $a^2$ at each end which enter the slots $a^3$ in the sliding blocks $a^4$ are made in the form of ears or lugs, somewhat narrower longitudinally of the machine than the remainder of the bar, for neatness of construction and compactness.

Figure 10:
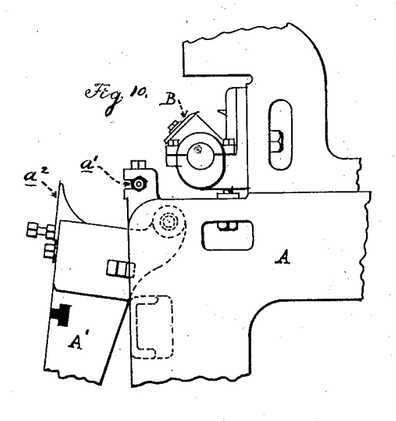
Fig. 10 is a side elevation of a portion of Figs. 3 and 4, showing the drop-down table as swung away from the lower planing-cylinder.

The capacity of the bar $a^2$ to be adjusted vertically, as described, allows of the depth of cut of the planing-cylinder B upon the lower face of the board to be regulated, and the capacity of the bar for horizontal adjustment enables it to be brought to the proper distance from the path of the knives of the planing-cylinder when its height is so regulated. At the same time, when the supplemental table A' is swung downward away from the cylinder, as shown in Fig. 10, it carries the bar $a^2$ with it and leaves the cylinder exposed for adjustment of its knives or other purposes.

Figure 1:
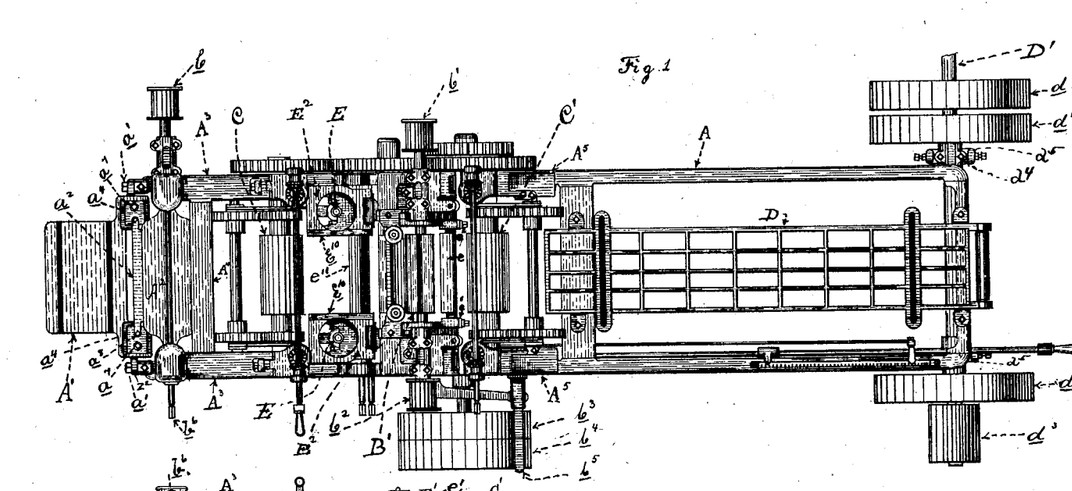
Figure 1 is a top plan view of a planing-machine having all the improvements attached thereto.
Figure 2:
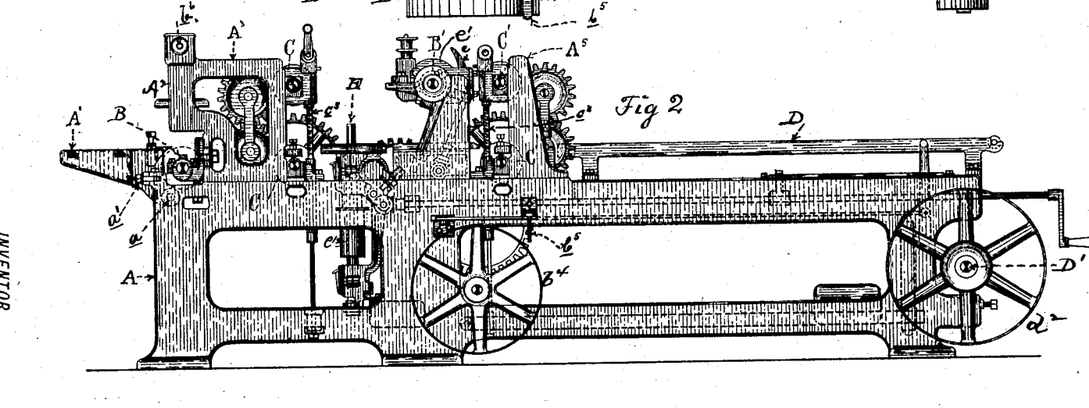
Fig. 2 is a side elevation of the same.

The upper platen, $A^2$, which bears upon the top of the board and resists the thrust of the lower planing-cylinder, slides up and down in guideways at each end of it, in the supplemental frame-piece $A^3$. The screws $b^8$ are journaled in this supplemental frame-work at each end of the platen and are tapped through holes passing vertically through its ends. Each of these screws is provided with a bevel-gear fixed to its upper end; and the shaft $b^6$, passing horizontally across the machine, is journaled in the supplemental frame-pieces $A^3$, and has mounted upon it, near each end, beveled gears $b^7$ $b^7$, which engage with the bevel-gears upon the upper ends of screws $b^8$, and enable the platen $A^2$ to be raised or lowered by revolving the shaft $b^6$. One end of this shaft projects beyond the frame-work of the machine, as shown in Fig. 1, and is squared to receive a crank to revolve it.

Figure 3:
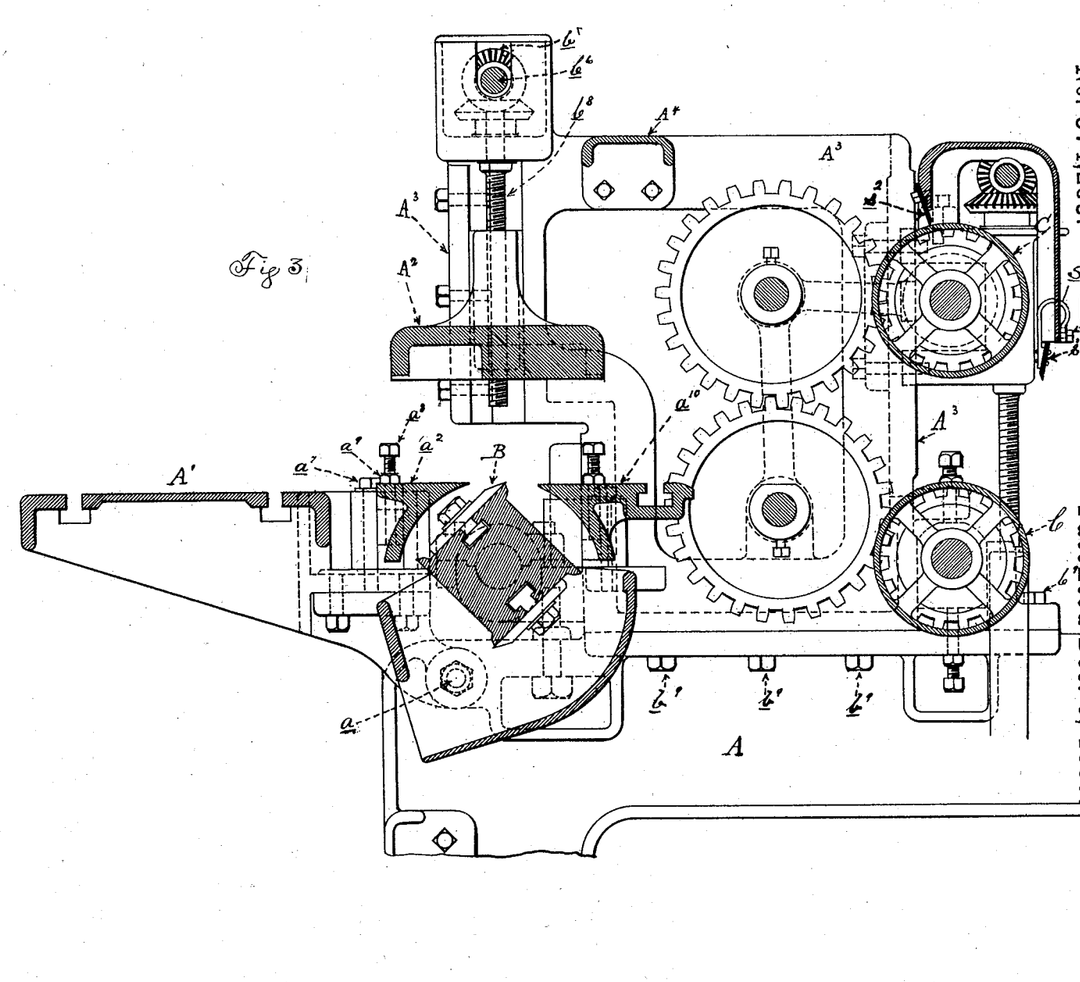
Fig. 3 is an enlarged central vertical section through a portion of the machine—at its feed-out end—showing the arrangement of the drop-table, its attached pressure bar, and our improvement in the construction of the frame and in attaching scrapers thereto, as hereinafter described.

The supplemental frame-pieces $A^3$ are made in the form of two uprights bolted to the frame A of the machine at their lower ends, these uprights being connected at their upper ends by a longitudinal tie-beam, each of the supplemental frame-pieces being constructed as above described. One of the uprights on each side of the machine sustains the platen $A^2$ and the other upright of each supplemental frame-piece sustains the feed-rollers C C and the gearing by which they are driven, which gearing, as shown in Fig. 3, is of the well-known expansion kind. These supplemental frame-pieces $A^3$ on each side of the machine also carry the boxes of the lower planing-cylinder, B, and the pressure-bar $a^{10}$ on the feed-in side of that cylinder. These supplemental frame-pieces $A^3$ are secured to the frame A of the machine by screw-bolts $b^9$ $b^9$, as shown in Fig. 3. They are united together across the machine by the girder $A^4$, which extends across from the horizontal tie piece of one to that of the other between their uprights. This construction takes the place of the ordinary vertical or upright bars, which are used separately to sustain the platen $A^2$ and the feed-rolls C C; and by the introduction of the longitudinal tie-piece, securing the upper ends of these upright bars together, we obtain great stability of construction and provide means for passing the transverse girder $A^4$ across the machine at a place where it is out of the way of both the platen $A^2$ and its adjusting mechanism and the feed-rolls C C and their driving-gearing without elevating it above either of these portions of the machine, and we also brace both of these upright bars which support the platen $A^2$ and the feed-rolls C C transversely by this single cross-girder $A^4$.

Attached to the housing of the upper feed-roll C is a metal scraper, $s'$, suspended on curved springs $s$ at each end, one of which is shown in Fig. 3, and attached to the same housing is a scraper, $s^2$. The scraper $s'$ is so adjusted that its lower edge comes in contact with the planed surface of the board after it has been dressed by the upper planing-cylinder, B', and it removes the dust, small chips, and gum from the latter before the upper feed-roll C comes in contact with it, thus preventing the feed-roll from compressing the hard particles of these substances in the board, and also preventing the gum, which may be brought to the surface of the board by the heat developed from the action of the upper planing-cylinder from coming in contact with the surface of the upper feed-roll C and adhering to it. This gum on the surface of the feed-roll soon gathers dirt, and thus stains and injures the dressed surfaces of other lumber subsequently passed under it, which, in case of its being finished in the wood, shows through the finish unless it is removed at considerable additional expense.

The scraper $s'$, by being hung upon a curved spring which allows it to rise vertically while yielding to the thickness or inequalities of the board, or upon two curved springs, permits the edge of the scraper $s'$ to be brought at the most effective angle upon the surface of the board to remove the gum.

We are aware that a scraper has been employed swung upon hinges at its upper edge; but as this construction altered the angle at which the edge was brought in contact with the board very greatly, as soon as the scraper yielded it allowed gum to pass under it without being removed, which is avoided by our scraper rising in a more vertical direction.

The scraper $s^2$ has its edge brought in contact with the roller to remove any gum or chips which may have passed onto the roller before they can be carried around again to fresh surfaces of the board.

The curved springs $s$, which sustain the scraper $s'$, are secured to the housing of the feed-roll C by screw-bolts $s^3$, passing through slots in the ends of the springs and tapped into the housing. These slots in the ends of the springs are elongated vertically of the machine, so as to allow of the springs being adjusted up and down on the bolts before they are screwed up, thus allowing the scraper $s'$ to be set or adjusted for different thicknesses of lumber. Instead of the elongated slots being made in the ends of the springs $s$ which are bolted to the housings, they may be made in the ends which are bolted to the scraper and allow of a like adjustment of the latter. This upper feed-roll C is adjusted up and down by vertical screws passing through one side of its boxes in the usual manner and driven by bevel-gears and a cross-shaft at their upper ends of the ordinary construction. The lower feed-roll C is fixed in its position by set-screws above and below its boxes.

The pressure-bar $e$ on the feed-in side of the machine is hung upon two curved arms, $e'$, this pressure-bar being immediately in front of the upper planing-cylinder. These curved arms are connected by pivots $e^2$ to the studs $e^3$, attached to the frame-work which carries the cylinder, the studs being placed on the opposite side of the cylinder from the pressure-bar and the arms curved over the shaft of the cylinder to give the proper scope of rise and fall to the pressure-bar.

Figure 5:
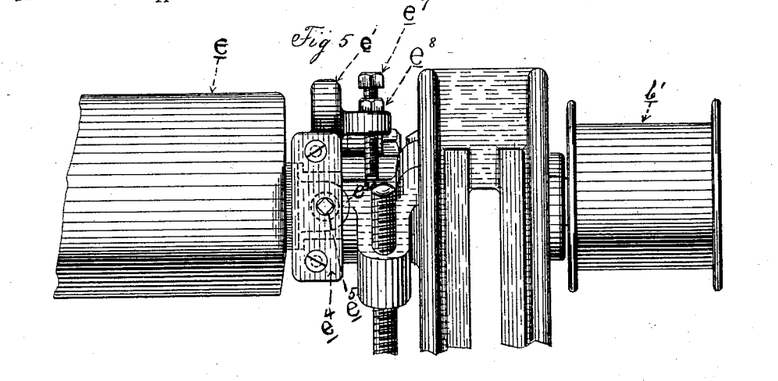
Figs. 5, 6, and 7 are detail views showing our improved arrangement of the pressure-bar for the upper planing-cylinder.
Figure 6:
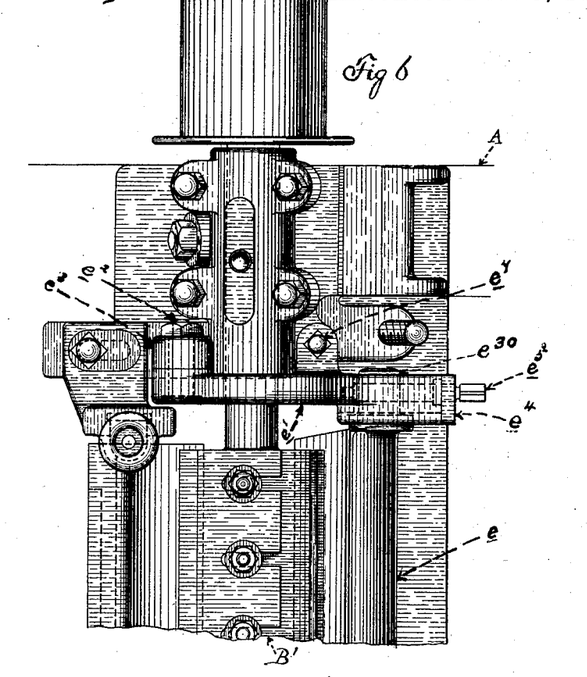
Figure 7:
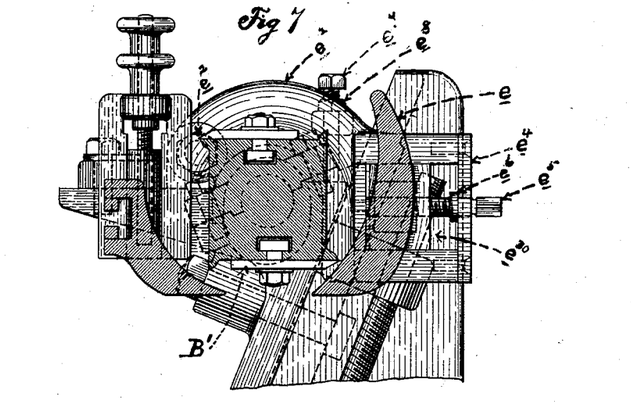

Fig. 5 is a rear elevation, Fig. 6 a top plan view, and Fig. 7 a vertical section longitudinally of the machine, of one end of the pressure-bar and its connected parts enlarged from Fig. 1 to show the details of construction.

With pressure-bars suspended as described, it has heretofore been found somewhat difficult to set them up nearer to the path of the knives of the cylinder or farther away therefrom with accuracy and to secure them in position when adjusted. This was because the pressure-bar must have a limited play or looseness at each end in its attachment to the pivoted arms $e'$ $e'$ in order to allow it to adjust itself to boards of unequal thickness toward their opposite edges or in cross-section. In order to provide means for accuracy and certainty in this adjustment of the pressure-bar, while allowing its automatic adjustment, as described, we attach to the outer end of each of the curved arms $e'$ a rectangular-shaped box or pocket open on its inside face to receive the lug $e^{30}$, projecting from each end of the pressure-bar and of only about two-thirds the horizontal breadth of the pocket and fitting loosely therein vertically, as shown in Fig. 7 and in dotted lines in Fig. 5. This box on the end of the curved arm has its exposed edge or side formed of a plate, $e^4$, attached to its horizontal sides by screw-bolts, as shown. This plate may be removed by unscrewing and removing these bolts. Through the plate $e^4$ near its center is journaled a screw, $e^5$, having a squared end projecting through the plate $e^4$ outward to receive a wrench to turn it. This screw is tapped through the lug $e^{30}$ on the pressure-bar, and has its other end journaled in the opposite side of the pocket from the plate $e^4$. A collar, $e^6$, on the screw $e^5$ takes a bearing upon the inner face of the plate $e^4$ and holds the screw in its position, as described.

By turning the screw $e^5$ the end of the pressure-bar will be adjusted inward or outward with relation to the path of the knives of the planing-cylinder, and both ends of the pressure-bar may thus be adjusted alike. At the same time these screws $e^5$ serve as pivots, allowing the necessary play vertically between the arms $e'$ and the ends of the pressure-bar, upon which it may automatically adjust itself to the varying thickness of the lumber, as before described. The screw-bolts $e^7$ are tapped through lugs on the sides of the arms $e'$, and have their lower ends resting upon the boxes which carry the planing-cylinder. By turning them in one direction or the other the arms $e'$ are revolved on their pivots $e^2$, and the height of the pressure-bar is adjusted as desired. Check-nuts $e^8$ on the screw-bolts $e^7$ secure them from turning when properly adjusted.

Figure 8:
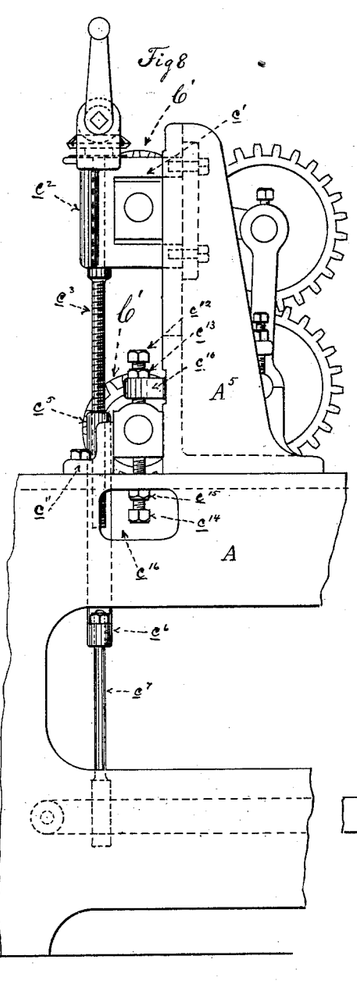
Figs. 8 and 9 are detail views showing our improved construction and arrangement of the parts which serve to adjust the feed-rollers to each other and to apply the pressure to the upper one.
Figure 9:
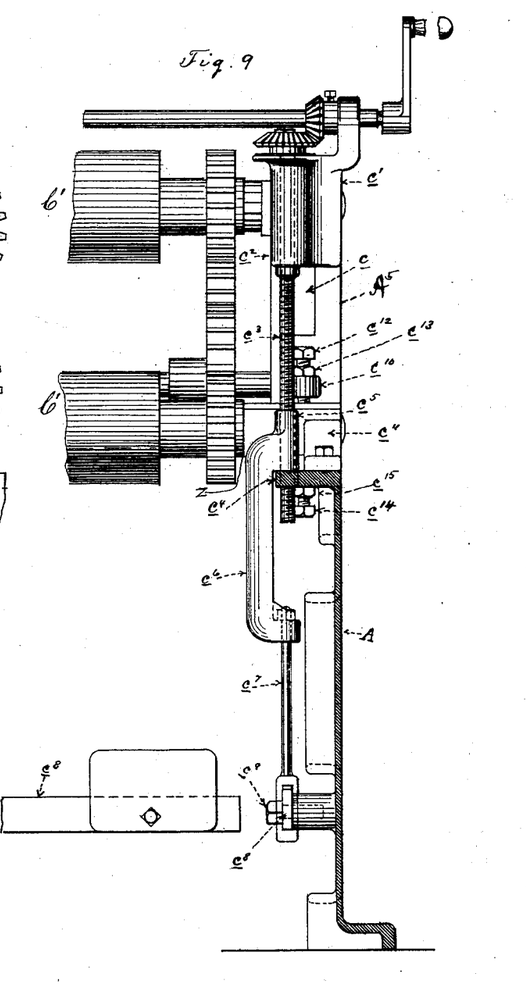

Figs. 8 and 9 show our improvements in adjusting and weighting the feed-rollers C′ C′. To the frame A on each side is bolted an upright, $A^5$. Through this upright is formed a slot, $c$, in which the box $c'$ slides freely up and down by means of bolts extending through the slot from the box, carrying a face-plate secured on the opposite side of the slot. The face of the box $c'$, in which the end of the upper feed-roll is journaled, bears against the vertical edge of the upright $A^5$ and keeps the box true in moving up and down. This arrangement of bolts and face-plate is shown in dotted lines in Fig. 8, and is well known and will be understood without further description. The box $c'$ carries on its outer side a sleeve, $c^2$, in which is journaled the vertical screw $c^3$ at its upper end. The lower end of this screw passes through a horizontal lug, $c^4$, attached to the frame A of the machine and revolves freely therein. A nut, $c^5$, is fitted to the screw $c^3$ and rests upon the upper surface of the lug $c^4$, thereby sustaining the upper feed-roll C′ at any desired distance above the lower feed-roll. To this nut $c^5$ is attached the curved arm $c^6$, which passes around the lug $c^4$, and has attached to its lower end the weighted lever $c^8$ by means of the rod $c^7$, as shown.

The weighted lever passes through a slot in the lower end of the rod $c^7$, such slot being placed between the pivot $c^9$, on which the lever turns, and the weight at the outer end of the lever. This construction of the parts causes the full pressure of the weight to be brought to bear upon the upper feed-roll $C'$ at each end as soon as the thickness of the lumber passing through the machine raises the upper feed-roll and lifts the nut $c^5$ off from the lug $c^4$, and also allows the pressure of the lever to be brought to bear upon either end of the feed-roll independently of the other end. The feed-roll can also adjust itself to inequalities of the thickness of the board transversely of it in the usual manner.

The lower feed-roll is fixed in its bearings when the machine is in operation; but in order to provide for its proper alignment and to enable it to be removed and replaced without taking off the other parts of the machine we provide the following means: On the vertical edge of the upright $A^5$ is fixed a lug, $c^{10}$, horizontally over the box in which the feed-roll is journaled and at a sufficient distance above the frame A to allow of a movement of the box up and down between them. A bracket, $c^{11}$, is bolted to the frame A on its upper edge at the proper distance from the upright $A^5$, to confine the lower feed-roll box between it and the vertical face of the upright, while allowing the box to move up and down between them. A set-screw, $c^{12}$, is tapped through the lug $c^{10}$ from its upper side, and has its lower end bearing upon the upper side of the feed-roll box. It is provided with a binder-nut, $c^{13}$, to confine it in position when adjusted. Another set-screw, $c^{14}$, is tapped upward through the lug $c^4$, and has its upper end brought to bear against the lower face of the feed-roll box. It is also provided with a binder-nut, $c^{15}$, to secure it in position when adjusted. The feed-roll box of the lower feed-roll has a lip passing around behind the inner face of the upright $A^5$, which prevents it from escaping outward from the frame when the bracket $c^{11}$ confines it in its position, as shown, and it is held from moving inward by a shoulder, $z$, on the axis of the feed-roll. By means of the set-screws $c^{12}\ c^{14}$ at each end the boxes of the lower feed-roll can be adjusted to bring it to the proper level or alignment, and by means of the removable bracket $c^{11}$ it can be taken out of the machine by removing the bracket and taking off its boxes without disturbing the other parts, the removal of the bracket allowing the box to be moved far enough toward the screw $c^3$ and arm $c^6$ to disengage the lip on the box (shown in dotted lines in Fig. 8) from behind the upright $A^5$ when the box is pulled off the end of the shaft. An aperture, $c^{16}$, is formed in the side of the frame A, opposite the set-screw $c^{14}$, to give access to it for adjusting it or removing it when desired.

Figures 11, 12, 13:
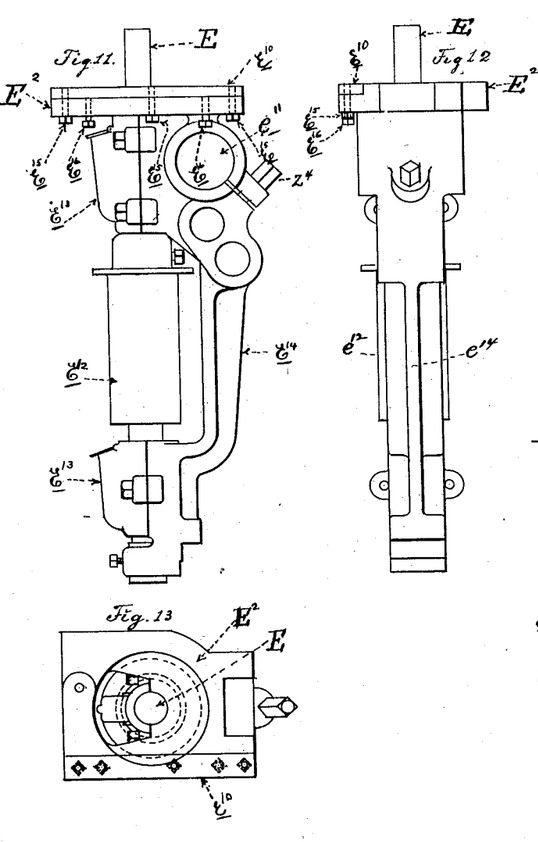
Figs. 11, 12, and 13 are detail views showing our improved arrangement and construction of the tables connected with the matching-cylinders.

Figs. 11, 12, and 13 show the parts of the frame-work of the machine which carry the vertical tonguing and grooving cutters on their shafts E E, removed from the machine. These tonguing and grooving cylinders are adjusted horizontally to and from each other by a horizontal screw passing through the box of one of them in the usual way to accommodate them to different widths of lumber upon the rod or bar $e^{11}$, (shown in Fig. 1,) which passes through the sleeve carrying them. (Shown in Fig. 11.) The pulley $e^{12}$ drives the cutter-head shaft E, which is supported in boxes $e^{13}\ e^{13}$, connected together and to the rod $e^{11}$ by the curved arm $e^{14}$ in the usual manner. This is accomplished by having a sleeve surrounding bar $e^{11}$, carrying these several parts, which is clamped upon the bar by being split on one side and having a set screw, $z^4$, passing through an ear on the sleeve, which may be set up or loosened in the usual way. On the upper end of this arm $e^{14}$ is fixed a small table or platform, $E^2$. Along the edge of this table, over which the lumber passes while being operated upon by the matching-cylinders, a recess is cut, in which a hardened metal plate, $e^{10}$, is secured to resist the wear caused by the friction of the lumber in passing over it. This plate is secured by set-screws $e^{15}\ e^{15}$, passing through holes in the table from beneath it and tapped into the hardened plate $e^{10}$, with their upper ends flush with the upper surface of the plate. This construction enables us to loosen the set-screws from time to time as the hardened plate wears away, and interpose a thickness of other metal—as zinc, for instance—between the table $E^2$ and the lower surface of the hardened plate, thereby bringing the latter up to the proper level with the utmost nicety, which is important in order to have the matching-cutters groove and tongue the board accurately. We also provide supplemental set-screws $e^{16}$, which are tapped through the table $E^2$ from beneath and have their ends bearing upon the lower face of the hardened plate $e^{10}$. By turning these up the hardened plate $e^{10}$ may be adjusted to take up slight wear on its upper surface, which is too minute to be compensated for by metal interposed between it and the table, as before described.

Figure 14:
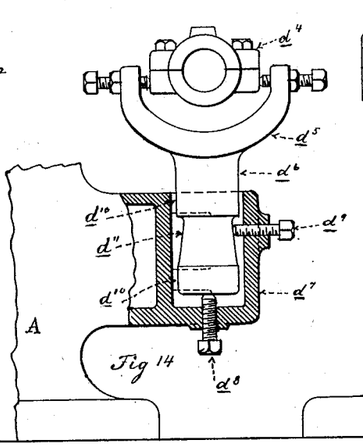
Figs. 14, 15, and 16 are detail views of the stands and boxes which support the main counter-shaft, constructed according to our improvement.
Figure 15:
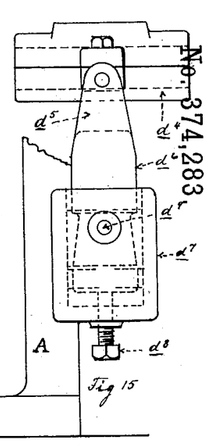
Figure 16:
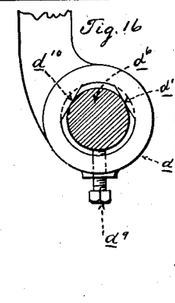

Figs. 14, 15, and 16 represent, respectively, a vertical section, a side elevation, and a top view of the stand which carries the boxes of the driving-shaft D'. The box $d^4$ is hung in the yoke $d^5$ by means of set-screws in the usual manner. This yoke is attached to a downwardly-projecting stem, $d^6$, which is supported in a vertical pocket of the stand $d^7$, as shown, this stand being attached to the frame A. The stem $d^6$ is adjusted in its pocket vertically by the set-screw $d^8$, tapped through the wall of the pocket from beneath, and is confined in position, when so adjusted, by the set-screw $d^9$, tapped horizontally through the side wall of the pocket. Heretofore much difficulty has been experienced from the strain on the belt causing the stem $d^6$ to rise out of the pocket, and we overcome this by providing the pocket, on the side opposite to the set-screw and above and below the horizontal plane of the same at some distance, with inwardly-projecting ledges $d^{10}$ $d^{10}$, placed opposite to each other in pairs, and having their inner faces, which bear against the stem $d^6$, forming an acute angle with each other. The portion of the stem $d^6$ between the upper and lower pairs of ledges $d^{10}$ is turned down, forming the frustum of a cone or an equivalent conical form, with its larger end downward, as shown at $d^{11}$. When the set-screw $d^9$ is set up against the stem $d^6$, the opposite side of the stem is wedged above and below the level of the set-screw between the inclined faces of the ledges $d^{10}$ $d^{10}$, and the conical or inclined form of the stem at $d^{11}$ effectually prevents its rising under any strain from the driving-shaft, which would only serve to grip the stem harder between the set-screw and the ledges. At the same time it will be observed that the stem $d^6$, yoke $d^5$, and box $d^4$ of the driving-shaft are capable of revolving in a horizontal plane to allow the box to align itself with the driving-shaft and thus avoid undue friction in running the latter.

Instead of having the conical or inclined shape $d^{11}$ extend entirely around the stem $d^6$, it may be made only upon the side of it where the set-screw $d^9$ takes its bearing.

We do not claim herein, broadly, the bar $a^2$ and its vertical and horizontal adjustment with the blocks $a^4$, as the same is described and claimed in the application of Solomon A. Woods, No. 212,786, filed September 6, 1836; but

What we claim as new and of our invention is—

1. The combination of the supplemental table A', pivoted to the frame A, the bar $a^2$, vertically adjustable in the sliding blocks $a^4$, and the latter made horizontally adjustable upon the pivoted supplemental table, substantially as described.

2. In a machine for dressing lumber, the combination of the main frame A, the supplemental frame-pieces $A^3$ on each side of the same, attached at their lower ends to the main frame, each formed of two uprights carrying the platen $A^2$ and its adjusting mechanism, and the feed-rolls C C and the driving-gearing of the latter, located between these supplemental frame-pieces, respectively connected together at the top by a longitudinal tie-beam, and the single transverse girder $A^4$, connecting said supplemental frame-pieces $A^3$ $A^3$ together at their upper ends across the machine between said rolls and gearing and said platen, substantially as described.

3. The combination of the upper planing-cylinder, B', the upper feed-roll C, located on the feed-out side of said cylinder, and the scraper s', adapted to scrape off loose material from the surface of the board, located between said planing-cylinder and feed-roll and mounted on a curved spring or springs, s s, substantially as described.

4. The combination of the upper planing-cylinder, B', the upper feed-roll C, located upon the feed-out side of said cylinder, and the scraper s', adapted to scrape off loose material from the surface of the board, located between said planing-cylinder and said feed-roll and mounted on a curved spring or springs, s s, adjustably connected to the frame of the machine, substantially as described.

5. The combination of the planing-cylinder B', the pivoted arms e' e', the pressure-bar e, and the screws $e^5$ $e^5$, adjustably connecting the ends of the pressure-bar to said arms and serving as pivots, adapted to allow the pressure-bar to automatically adjust itself thereon to the varying thicknesses of the lumber, substantially as described.

6. The combination of the planing-cylinder B', the pivoted arms e' e', carrying on their outer ends boxes or pockets having the wall or side thereof, $e^4$, removable, the pressure-bar formed with projections or lugs on its ends, projecting into said pockets, and the screws $e^5$ $e^5$, journaled in the removable sides of said pockets and the sides opposite thereto and engaging with threaded holes in the lugs of said pressure-bar and adapted to adjust the same to and from the planing-cylinder, substantially as described.

7. The combination of the lower feed-roll C', sustained in a fixed position, the upper feed-roll C', mounted in boxes c' c', sliding vertically upon the uprights $A^5$ $A^5$ and provided with sleeves $c^2$ $c^2$, the screws $c^3$ $c^3$, journaled in said sleeves and revolving in the lugs $c^4$ $c^4$ of the frame A, and the nuts $c^5$ $c^5$, provided with the curved arms $c^6$ $c^6$, extending around said lugs and connected at their lower ends to the weighted levers $c^8$ $c^8$, substantially as described.

8. The combination of the lower feed-roll C' and its box, in which it is journaled, the frame A, the upright $A^5$, provided with the lugs $c^{10}$, the removable bracket $c^{11}$, bolted to the frame, and the set-screws $c^{12}$ $c^{14}$, bearing against said feed-roll box upon its upper and lower faces, substantially as described.

9. The combination of the table $E^2$ of the vertical cutter-head, provided with a recess upon the upper face, extending across the portion thereof over which the lumber passes, the supplemental piece or plate $e^{10}$, fitting said recess, and one or more screws, $e^{15}$, securing said table and supplemental plate adjustably together, substantially as described.

10. The combination of the table $E^2$ of the vertical cutter-head, provided with a recess upon the upper face thereof, over which the lumber passes, the supplemental piece or plate $e^{10}$, fitting said recess, and one or more screws, $e^{15}$, and set-screws $e^{16}$, securing said table and supplemental plate adjustably together, substantially as described.

11. The combination of the driving-shaft box $d^4$, its supporting-stem $d^6$, provided with the conical surface $d^{11}$, and the stand $d^7$, provided with the pocket adapted to receive said stem, and with the adjusting-screw $d^8$ and the binding-screw $d^9$, substantially as described.

12. The combination of the driving-shaft box $d^4$, its supporting-stem $d^6$, provided with the conical surface $d^{11}$, and the stand $d^7$, provided with the pocket adapted to receive said stem, having opposite inclined lug-faces $d^{10}$ $d^{10}$, and provided with the adjusting-screw $d^8$ and the binding-screw $d^9$, substantially as described.

SOLOMON A. WOODS.
JOHN R. THOMAS.

Witnesses:
DAVID HALL RICE,
CHAS. L. FITCH.